Aug. 28, 1962  E. A. SANFORD ETAL  3,051,589
CORROSION RESISTANT COATED EQUIPMENT
AND METHODS OF MAKING THE SAME
Filed Aug. 13, 1958  2 Sheets-Sheet 1

INVENTORS
ELBERT A. SANFORD
GEORGE WARREN

ATTORNEY

Aug. 28, 1962 E. A. SANFORD ETAL 3,051,589
CORROSION RESISTANT COATED EQUIPMENT
AND METHODS OF MAKING THE SAME
Filed Aug. 13, 1958 2 Sheets-Sheet 2

INVENTORS
ELBERT A. SANFORD
GEORGE WARREN
ATTORNEY.

United States Patent Office  3,051,589
Patented Aug. 28, 1962

3,051,589
CORROSION RESISTANT COATED EQUIPMENT
AND METHODS OF MAKING THE SAME
Elbert A. Sanford, Rochester, and George Warren, Gates, N.Y., assignors to Pfaudler Permutit, Inc., Rochester, N.Y., a corporation of New York
Filed Aug. 13, 1958, Ser. No. 754,886
13 Claims. (Cl. 117—70)

This invention relates to corrosion resistant coated equipment and methods of making the same and, more particularly, to coated processing containers and other equipment and accessories having improved resistance to mechanical or thermal shock, as well as to methods of enameling the same, one object of the invention being the provision of improved equipment of this type.

Metallic equipment has commonly been enameled or glass coated in the known manner in which the metal is sandblasted and cleaned, covered with one or more coats of fused enamel depending upon the nature of the equipment and the severity of the corrosive attack to which it may be subjected.

It is known that such glass or enamel coats have commonly contained relatively large bubbles, frequently near the outer surface of the coating, which tend to reduce the local physical resistance of the coating to flexing and cracking. Furthermore, such bubbles frequently will develop pin holes when exposed to the action of corrosive media and greatly cut down the useful life of the glass coating.

It has been found that this bubble structure may be refined and the bubbles more evenly dispersed throughout the body of the glass by the addition of discrete particles of refractory material to the glass. While the mechanism of this action is not absolutely clear, it is believed that these particles provide nuclei for the formation of bubbles. Since these particles are evenly dispersed, the gas tends to assume the form of small bubbles evenly dispersed throughout the glass, rather than in large bubbles or conglomerates of fine bubbles close together. For this reason, another object of this invention is the refining of the bubble structure through the provision of a large number of fine discrete particles dispersed throughout the body of glass. One of the most important characteristics of vitreous coatings is their resistance to corrosion and chemical attack. This property permits the production of articles made of strong but relatively inexpensive base metals of the requisite weight for resisting the pressures and other stresses to which the articles are subjected, and the protection of the exposed surfaces by means of vitreous coatings which provide complete protection for the base metal from corrosive attacks. However, the effectiveness of this corrosion resistant vitreous coating depends on its thickness and the absence of porosity. The existence of pores or thin spots in the coating reduces its effectiveness in protecting the base metal and may allow the corrosive agents to reach the base metal. This will not only cause corrosion of the base metal, and contamination of the product, but also tends to undermine the corrosion resistant coating in the areas immediately adjacent the original failure. This causes rapid growth of the area subject to corrosive attack, and will ultimately result in the failure of the entire container.

It has been found that this effect is minimized by the refinement of the bubble structure of the vitreous coating by the inclusion of the discrete particles as described above. The refining of the bubble structure eliminates the presence of large bubbles in the coating which commonly form the initial starting points for corrosive failure of the coating. The even dispersion of the bubbles not only eliminates such potential points of failure in the coating, but increases the effective thickness of the vitreous coating by eliminating the thin spots which existed where large bubbles were found in coatings heretofore in use. This results in a higher degree of effective protection for any given thickness of the coating. There are numerous applications for glass or vitreous enamel coated apparatus wherein a smooth, ground or lapped surface is required. Such applications include valve seats, joints for use in high vacuum apparatus, surfaces for use in stuffing boxes or fluid tight mechanical seals, gasketed fluid tight joints and other applications of a like nature where a ground or lapped surface necessitates the use of a vitreous coating of uniform structure free from large bubbles, pits and other similar imperfections.

In the past, it has been found difficult to provide a vitreous coating of the above nature, since the presence of large bubbles caused pits when the surface was removed by grinding. However, it has been found that the refinement of the microstructure resulting from the even dispersion of bubbles caused by the discrete particles provides a vitreous coating having a fine uniform structure which is ideally suited for grinding and lapping to a flat surface finish. The absence of large bubbles at or near the surface prevents the opening of pits or cavities during the grinding or lapping operation, and results in the smooth, uniformly corrosion resistant surface which is required for this purpose. For this reason, another object of this invention is the provision of a vitreous enamel coating of the above description having a uniform and refined microstructure which is adapted for the production of ground or lapped surfaces.

It has also been found that the thermal shock resistance of the glass and the performance strength thereof are greatly improved by the addition of discrete particles of a refractory material evenly dispersed throughout the body. In order to be effective for this purpose, those particles must be relatively large, that is, in order of the magnitude larger than the fine particles described above which are most effective in refining the bubble structure. Further, these particles must have certain thermal and mechanical properties with respect to the glass in order to be effective. More specifically, it has been found that in order to be effective in increasing the thermal and mechanical strength of the glass, the discrete particles dispersed therein must have a coefficient of expansion which differs considerably from that of the glass itself, and preferably must have a modulus of elasticity different from the glass. It has been found in practice that particles having a coefficient of thermal expansion differing materially from that of the glass are most effective in causing this improvement of the physical and thermal characteristics thereof. While the mechanism of this particular action is not clear, it is believed that such particles set up areas of localized stress when the glass cools after firing and that these islands of localized stress are responsible for the improvement of both the thermal shock resistance and strength of the coating. In any case, it has been found that this improvement in properties does occur and such improvement of the mechanical and thermal properties of the glass is another object of this invention.

Vitreous coatings of the above description are often subjected to a certain amount of abrasion during normal use. For example, abrasion and wear are caused by the turbulence incident to flow and agitation of abrasive containing fluids, or the rotation of coated shafts in contact with the packing in stuffing boxes. For these reasons, certain applications require that the vitreous coating be resistant to abrasion.

It has been found that the improvement of the mechanical strength of the glass caused by the inclusion of the relatively large discrete particles as described above also has the effect of greatly improving the abrasion resistance of the coating. The reason for this effect is not definitely known. It is probable that the increased strength of the coating contributes to the increased abrasion resistance, although increased strength and abrasion resistance are not usually considered as being related properties. It is also possible that the refinement of the microstructure and the resulting homogeneity may contribute to this result. In any case, the effect has been found to exist, and, for this reason, the improvement of the abrasion resistance of vitreous enamel coatings by the inclusion of discrete particles is another object of this invention.

While it is desired to improve the thermal and mechanical properties of the glass, it is of course desirable that these objects be accomplished without the sacrifice of the other desirable characteristics of glass or vitreous enamel coatings. For example, it is necessary that the particles added to the body of the glass have chemical and corrosion resistant properties such that they do not degrade the corrosion resistance of the glass. To this end, it is necessary that the materials added to the glass for the improvement of the mechanical properties be in themselves corrosion resistant, and the improvement in the mechanical properties by the provision of corrosion resistant refractory materials is another object of this invention.

A further desirable property of glass is its smooth and glossy vitreous surface. One of the principal advantages and most desirable characteristics of vitreous coatings is its "fire-polished" glossy surface. Such a surface is desirable for ease of cleaning; in order to prevent the adhesion of plastic or sticky materials processed in coated containers; and for sanitary reasons. For this reason, it is highly desirable that any additions to the coating material, added for the purposes of the improvement of other characteristics, be so chosen that they do not impair this desirable feature of the glass. It has been found, for example, that the fine particles which are used for the refining of the bubble structure, as described above, do not have any appreciable deleterious effect on the gloss of the coating provided they are added in the small quantities required for the refinement of the bubble structure. However, the relatively coarse particles used for setting up the islands of stress described above may have deleterious effects on the glossiness of the finished enamel surface if the particle size is too large or if they are added in excessive quantities. For this reason, it is desirable that the particle size of the coarse mill additions be restricted to a size that will not substantially impair the glossiness of the finished coating and that the quantity thereof be limited for the same purpose. The choice of the particle size and the limitation of the quantity thereof to accomplish their desired objects without impairment of the glossiness of the surface of the vitreous enamel is therefore another object of this invention.

A further object is to provide a method for controlling the physical structure of the glass in the beneficial manner described above and capable of being readily and economically carried out with existing apparatus and equipment.

To these and other ends the invention resides in certain improvements and combinations of parts and method steps, all as will be hereinafter more fully described, the novel features being pointed out in the claims at the end of the specification.

Other objects and advantages of our invention will be set forth in the claims and will be apparent from the following description, when taken in connection with the accompanying drawings, in which:

Figure 2:
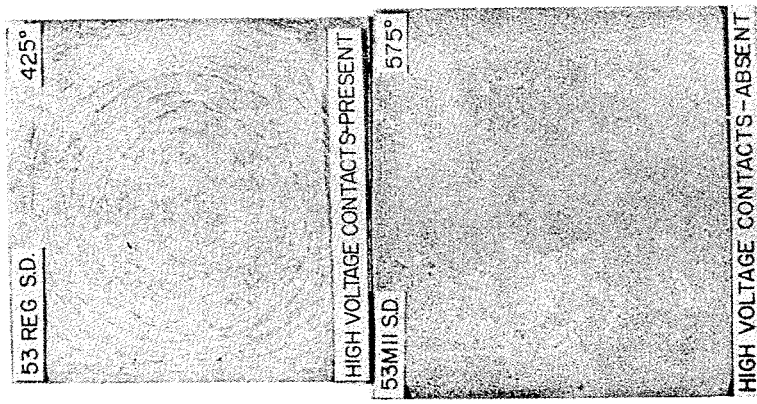
FIG. 2 is a photograph similar to FIG. 1 showing the results of a second thermal shock test.

In the method of enameling the surfaces of metallic objects in general use, glass frits are formed by smelting suitable compositions and chilling the molten glass to produce friable particles or frits. Typical compositions for ground coat and cover coat frits are as follows:

*Ground Coat*

| | Percent |
|---|---|
| $SiO_2$ | 50.1 |
| $Al_2O_3$ | 7.1 |
| $Na_2O$ | 20.7 |
| $K_2O$ | 20.7 |
| $B_2O_3$ | 13.0 |
| $CaF_2$ | 7.5 |
| $MnO_2$ | 1.2 |
| $Co_3O_4$ | 0.4 |
| $NiO$ | 1.2 |

*Cover Coat*

| | |
|---|---|
| $SiO_2$ | 53.8 |
| $Al_2O_3$ | 1.0 |
| $TiO_2$ | 15.3 |
| $Na_2O$ | 7.0 |
| $K_2O$ | 2.0 |
| $B_2O_3$ | 13.1 |
| $MgO$ | 2.0 |
| $ZnO$ | 1.0 |
| $CaO$ | 1.0 |
| $NaF$ | 3.6 |

Such fused or fritted compositions are milled in a porcelain mill with water, suitable clays and electrolytes to suspend the frit and form a wet slip with which the metal surface is sprayed. The slip is then heated, dried and fired to that it fuses and forms a continuous layer of enameling providing a ground coat closely adhering to the surface of the metal.

Cover coats, with suitable slips formed as described above, have then been commonly applied over the ground coat in either of two ways, one known as the "spray-dust" method and the other as the "hot-dust" method. In the "spray-dust" method, a ground coat is formed as described above. Cover coat slip is then sprayed over the ground coat. While the cover coat is still wet, a further quantity of frit composition, in dry powdered condition, is dusted over the wet surface to which it adheres. This coating is then dried and fired so as to fuse the cover coat to the ground coat and form a single, integrally fused coating. This operation may be repeated as often as desired to build up the desired thickness of cover coat enamel to suit the requirements of particular applications.

The "hot-dust" method is more commonly employed for coating articles of smaller size and readily accessible shapes which are adapted for close approach by the workmen. After the firing of the ground coat, and while it is still in more or less molten condition, it is dusted with a dry powdered cover coat frit composition which adheres to the hot ground coat. The article is then again fired, fusing the two coats into an integral enamel covering. The article may be repeatedly redusted in the same manner as often as required to increase further the thickness of the enamel, although in such "hot-dust" applications, two cover coats are usually sufficient.

Chemically resistant enamels such as those described above, commonly contain high proportions of silica and other oxides having relatively high melting points and, therefore, must be fired at high temperatures ranging from approximately 1,400 to 1,700 degrees Fahrenheit. These enamels may be applied only to metals having a melting point appreciably higher than the firing range of the enamels, as described above, in order to avoid melting or excessive distortion of the metal during firing. The most common metal bases used for this purpose are iron, steel, and various iron-nickel and iron-nickel-chromium alloys.

It is well known that the clays and inorganic salts added as mill addition to the cover coat frit to make a workable slip, as described above, as well as the metal itself, tend to evolve gas at these higher firing temperatures, which cause the large bubbles in the enamel described above. Such large bubbles are particularly objectionable in the cover coat or surface of the enamel where thermal shocks or mechanical impacts are most likely to occur. For example, when hot liquid is run into a cold tank, or cold liquid run into a hot tank, the contact of the liquid with the enamel surface produces an abrupt change in temperature which results in severe local stresses which may cause cracking, chipping, or spalling of the enamel. The structure of the cover coat or coats at the surface of the enamel is especially important because this is the region at which the mechanical and thermal stresses are most severely applied.

The present invention resides in the conception that resistance to mechanical and thermal stresses and to corrosive attack may be improved by control of the physical structure of the cover coat or coats, including the size and distribution of the contained bubbles; the provision of islands of localized stress; and in the provision of a practicable and effective method of developing such structure. It is believed to be new to attempt to control and improve such physical properties of glass fused to metal by controlling the physical structure of the entire enamel section.

It has been found that the properties of an enamel coating are distinctly improved in the respects referred to by eliminating the presence of large bubbles in the cover coat or coats and that this can be accomplished by the provision of discrete particles evenly distributed throughout the coating. This may be accomplished, for example, by incorporating certain mill additions to the wet and dry slip mixtures for both the "spray-dust" and "hot-dust" methods. These mill additions serve to provide a large number of finely divided, discrete particles suspended in and distributed through the molten glass to serve as nuclei for the formation of small bubbles. It has been found that when gases have evolved within the mass of molten glass, small bubbles tend to be formed on such suspended particles as nuclei and that a sufficient number and distribution of these particles brings about the desired uniform distribution of such small bubbles.

The mill additions for this purpose must be inert and refractory, at least to the extent that they must be able to withstand the high firing temperatures of the glass without melting, decomposition or solution in the glass. However, they must be capable of being wetted by the glass in order to produce a strong bond. It has been found that several inert and refractory oxides or mineral substances such as silica in amorphous or crystalline phases, titania, zircon, mullite, sillimanite, and the like, or mixtures thereof, are satisfactory agents for this purpose. These new ingredients may be added to the coating mixtures and mixed therein at any desired stage, but it is preferred to include them as mill additions to the frit mixture. This results in the thorough mixing and even distribution of such refractory particles in the slip. The proportion and size of the refractory particles added to the coating mixtures may be varied within a reasonable range, in order to produce the desired effect. However, in each case the particles must be of a size sufficiently small so as to lie wholly within the enamel coating and not appreciably affect the smoothness of the surface which has been found desirable in equipment of this sort. In addition, the proportion of the refractory particles should not be such as to destroy the glossiness of the surface or to produce a mat finish, since both glossiness and smoothness are highly desirable properties for both chemically resistant equipment used in chemical industries, and sanitary equipment used in the manufacture of food and drugs.

It has been found, for example, that substantially 5 percent (by weight) mill addition of silica produces the improvement described, but it is contemplated that the quantity of refractory material to be added will vary between ½ percent and 12 percent, depending upon the chemical composition and physical properties of the materials used. It has generally been found that as much as 12 percent mill addition of fine silica has very little effect on the glossiness of the finish, but that substantially greater amounts begin to have adverse effects on this property of the enamel. It is therefore desirable to limit the quantity of silica added to 12 percent although, in certain applications, it might be desirable to use greater amounts of silica sacrificing a certain amount of the gloss in order to gain greater refinement of the bubble structure. However, at the present time, it has been found that mill additions of substantially less than 12 percent will produce the desired improvement in the physical and chemical characteristics of the coating without appreciable sacrifice of the glossiness of the enamel coating.

It has been found that the fineness of the refractory mill addition is also important. In the case of silica, a fineness of minus 325 mesh (i. e., 95 percent will pass through a 325 mesh U.S. Standard sieve), has been found satisfactory. In the case of mullite, on the other hand, the optimum particle size appears to be about minus 200 mesh and it is contemplated that the particle size will range between minus 100 mesh and minus 500 mesh depending upon the chemical composition and physical properties of the materials employed. In no case has it been found either necessary or desirable to increase the size of the particles above 100 mesh in order to attain the desired refinement of the bubble structure and, in fact, larger particles may be less efficient in producing the desired effect.

It has also been found that the properties of the enamel coating are greatly improved in mechanical strength and thermal shock resistance by the presence of localized islands of stress. These islands of stress may be created by means of the presence of discrete particles in the enamel structure. In order to attain the desired end of setting up islands of stress, the discrete particles provided for this purpose must have coefficients of thermal expansion significantly different from the glass coating or matrix in which they are imbedded. The only reasonable exception is in the use of a material with a wide difference in modulus of elasticity which obviously would bring about the same result.

The discrete particles are present in the soft or plastic glass like matrix during the firing process. As the coating is allowed to cool, the matrix solidifies. Further cooling causes the matrix and the particles to contract at rates depending on their respective coefficients of thermal expansion. If, for example, the matrix should have a greater coefficient of expansion than the particles, it will contract at a greater rate, thereby tending to "squeeze" the particles to a volume smaller than they would normally occupy at that temperature. Compression stresses are then set up in the particles themselves and in the matrix immediately adjacent thereto.

Both the character and the magnitude of these stresses are dependent on the difference in the coefficients of expansion of the particles and the surrounding matrix. If the coefficient of the particles is greater than that of the matrix, the particles will contract faster than the matrix during cooling from firing temperature, and will have a tendency to shrink away from the surrounding matrix, and both the particles and the matrix will be under tension. Particles having a coefficient exactly equal to the matrix will contract at the same rate, and no forces will be generated during cooling. Particles having a smaller coefficient will cause compressive stresses as explained above.

From the above discussion, it is obvious that the magnitude of the stresses depends on the algebraic difference between the coefficients of expansion of the matrix and the particles. A large difference in these coefficients will increase the tendency of the particles to assume a volume differing from that imposed on it by the surrounding matrix and will cause the formation of corresponding high stresses.

For this reason, it has been found desirable to use particles having coefficients of thermal expansion radically different from the coefficient of the matrix to be employed. The choice of the material for use for this purpose is therefore governed, to a certain extent, by the properties of the glass like matrix, which are, in turn, dependent on the type of service for which the coating is intended. The factors underlying the choice of the composition of the matrix may include, for example, the resistance to attack by specific chemicals, gloss, color, and others. The formulation of glasses to attain various desired properties is well known in the art, and forms no part of this invention.

The size of the particles is also important in determining the properties of the coating. It is obvious that although all particles having a given coefficient of expansion will contract the same relative amount during a given drop in temperature, the absolute change in volume will depend directly on the size of the particle. Since the amount of stress set up in the coating depends on the accommodation imposed on the matrix by the particles, a large particle will have a greater effect than a small particle. However, the maximum size of the useful range of particle size is limited by the fact that the desired effect requires a large number of closely spaced islands of stress uniformly distributed throughout the coating, and the use of particles of excessive size would result in a non-uniform structure comprising large areas which are excessively stressed alternating with other areas which are inadequately stressed. Moreover, the maximum size of the particles is also limited by the desirability of preserving the gloss and smoothness of the vitreous coating.

For this purpose of setting up these desired localized areas of stress, it has been found desirable to use coarse particles and, in the case of silica, 80 mesh has been found to be satisfactory for the purposes herein desired. Larger particles might be even more effective but excessively large particles can also have the undesirable effect of destroying the smoothness of the enamel surface by projecting through the surface thereof which could easily become starting points for corrosive chemical attack. For this reason, the size of the large particles added for the purpose of setting up the localized areas of stress are in practice limited to 80 mesh, although for certain special applications where glossiness or smoothness of surface is not important larger particles could easily be used.

It can be appreciated that the chemical and physical properties of the material added in relatively coarse particles are far more critical than the properties of the material that is added in the form of very fine particles. The reason for this is that the large particles cover an appreciable area of the enamel coating and the use of mechanically weak or non-corrosion resistant materials over a large area might seriously weaken the enamel structure and degrade some of the desirable properties thereof. Since silica has been found to be very satisfactory both from chemical and physical considerations, and since it is a readily available material, it is the preferred material for the coarse particle addition. However, the scope of this invention is not restricted to the use of particles of any particular material since in the provision of certain types of enamel coatings, for certain purposes, the properties of other materials might be as desirable as those of silica.

In order to illustrate the result of the effect of the addition of silica to glass formulations, a quantity of cover coat glass was prepared according to the formulations given above. This cover coat was smelted and the molten glass was poured into water to form a homogeneous granular material. This material was then divided into two parts, and these parts were treated as follows: Part No. 1 was reduced to an enamel frit by grinding in a ball mill together with 0.8% by weight of bentonite (which acts as a suspending agent) and 0.6% by weight of potassium chloride (which acts as a flocculating agent to cause the slip to "set up"). All of the above is standard practice in the art, and comprises no part of this invention.

The second portion of cover coat formulation was similarly reduced to a slip together with 0.8% of bentonite and 0.6% of potassium chloride but, in addition, 5% of silica having the fineness of about 200 mesh and 5% silica having the fineness of about 80 mesh were added thereto.

Mild steel plates having a thickness of approximately three-eighths of an inch were then prepared for enameling by the usual processes of sand blasting and a ground coat having the formulation as given above was applied thereto and fired on in the usual manner. One set of these plates was then given a cover coat by the standard spray dust method using the first portion of the cover coat formulation, and the second set of plates was given a cover coat using the formulation including the silica mill additions. These cover coats were then fired on in the usual manner. The results of these tests are shown in the drawings by actual photographs of the samples prepared as described above.

Figure 1:
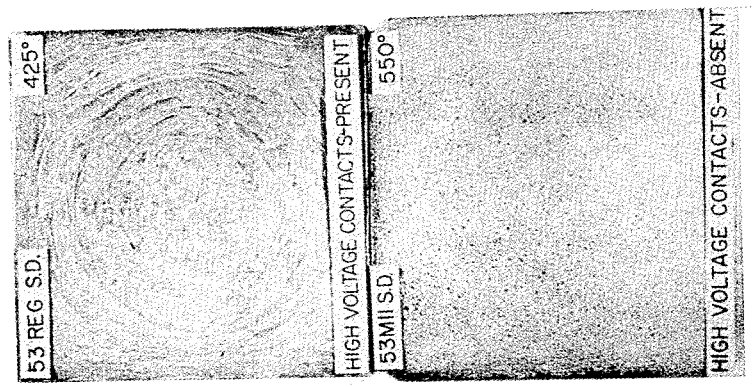
FIG. 1 is a photograph comparing the effects of severe thermal shock on specimens of known enamel coating material and the coating material embodying this invention.

Referring to FIG. 1, the upper plate which is marked by the legend "53 Reg. S.D." (Formula 53 glass, applied by regular spray dust method) has been coated with a cover coat from the first sample, without the silica mill additions, which represents the standard procedure heretofore used. The lower plate marked by the legend "53 M–11 S.D." (Formula 53 glass, with silica added, applied by spray dust method) was coated with the cover coat containing the silica mill additions embodying this invention.

Both plates shown in FIG. 1 were subjected to the standard thermal shock test which is currently used for evaluating glass and vitreous enamel coatings. This test has been devised to approximate actual service conditions in order to evaluate the performance of the coatings for industrial use. Since most common cause of failure of coatings by thermal shock is caused by running cold fluid into a hot container, the test comprises the heating of a coated sample of steel to a predetermined elevated temperature, and then subjecting the heated sample to an impinging jet of cold water in order to produce thermal shock conditions approximating those occurring in the field. The samples are heated in an oven to the predetermined elevated temperature, and then removed from the oven, and immediately subjected to the impinging stream of water which is maintained at a uniform temperature of 70 degrees Fahrenheit. This test has been found to yield consistently reproducible results, and gives the reliable indication of the performance of the enamel under service conditions.

In practice, during routine laboratory testing, the plates are repeatedly heated in the oven and subjected to the stream of cold water as described above. During each test, the sample is quenched from a temperature 25 degrees higher than the prior test. This repeated reheating and quenching is continued until the enamel fails, and the highest temperature attained prior to failure is an accurate measure of the thermal shock resistance of the particular coating tested.

Referring again to FIG. 1, it may be seen that the sudden drop in temperature caused by the impingement of the stream of cold water in the center of the plates caused rapid cooling of this portion of the plate, causing stresses proceeding from the center of the plate in a substantially circular configuration, proceeding from the center of the plates outwardly towards the edges. The results of this are plainly visible in the figures.

When the glass shows no visible signs of failure, it is a common practice to subject it to the so-called "stati flux" test. This test which is well known in the trade, comprises spraying the surface of the coating with charged particles of precipitated chalk suspended in a suitable fluid. When these charged particles are present on the surface or coating, an electric field is set up between the charged particles and the base metal somewhat in the manner of an electrical condenser. The charged particles are thereby attracted to the base metal underneath the coating. If there should be any thin spots or cracks in the coating, even through they do not penetrate to the base metal, the opposite electrical charges on the particles and the base metal causes the charged particles to migrate to these places. The charged particles therefore migrate to and congregate at cracks in the coating, thereby outlining the same and making them easily visible, although the cracks themselves may be so small that they are invisible under a microscope. This is a very exacting test, and will show the presence of small cracks or craze lines which may be so small as to be otherwise undetectable.

The drawings plainly show that the conventional enamel coating on the plate failed by cracking and spalling in a circular pattern as the sample was rapidly cooled. This cracking and spalling caused a flaking of the enamel from the surface of the plate, causing a substantial loss of coating and producing a series of concentric ridges and valleys. In some plates, the loss of coating was so pronounced that the base metal was either actually exposed, or the remaining coating was so thin that it could no longer pass the high voltage test which is commonly used in the industry for testing and evaluating the vitreous enamel coating. This test, which is well known, comprises the passing of a probe connected to a source of high voltage over the surface of the vitreous enamel coating. Since glass and other vitreous coatings are excellent insulators, the presence of sound enamel on the plate will prevent any flow of current from the probe to the plate. However, the presence of cracks or flaws in the enamel, or of areas of excessive thinness will allow the flow of current from the probe to the plate. This flow of current is indicated by the testing instrument, and indicates a break or a substandard area of the enamel. As shown on the legend in the upper plate of FIG. 1, numerous high voltage contacts were established through the cracked enamel which had undergone the severe thermal shock involved in these tests.

The difference in the resistance to thermal shock between the known vitreous enamels and the vitreous coating embodying the present invention is clearly illustrated by a comparison of the upper and lower plates shown in FIG. 1. It is to be noted that the lower plate, which was coated with the improved vitreous coating of this invention was subjected to a test considerably more severe than the upper plate which was coated with conventional enamel, since this plate was quenched from a temperature 125 degrees higher. In spite of the more drastic test to which the improved enamel was subjected, the damage it sustained is materially smaller. No cracks of craze lines were visible to the naked eye, and as far as could be observed the plate was entirely free from damage due to the thermal shock to which it had been subjected. However, this plate was then subjected to the "stati flux" test described above to render even the tiniest hair line cracks visible to the naked eye. The results of this "stati flux" test are clearly shown in the sample depicted in FIG. 1.

It is to be noted that although the very exacting "stati flux" test used on this sample does clearly show that the effects of the thermal shock to which the sample has been subjected have had some effect on the coating, this is not an indication of failure of the enamel coating. No imperfections were detected by the high voltage test described above. Moreover, it has been found through repetition of thermal shock tests that these invisible microscopic hair line cracks do not detract in any way from the serviceability of these coatings. Repeated thermal shock applied to the same area of the glass do not have any effect in increasing the number of these fine cracks as shown by the "stati flux" test. While the reason for the resistance of the coating to repeated thermal shock is not known, it has been theorized that the microscopic cracks probably serve the purpose of microscopic expansion joints which allow the vitreous coating to yield during the rapid contraction caused by the severe thermal shocks. In any case, whatever the precise mechanism is, it is a proven fact that such cracks do not appear to become more severe during repeated thermal shocks and do not indicate an incipient failure in the coating.

The results of a second series of tests are demonstrated in FIG. 2. In this figure, the upper sample represents a plate coated with conventional vitreous enamel applied by the "spray-dust" method which was quenched in water from a temperature of 425 degrees Fahrenheit. The lower sample represents a plate coated with the improved enamel embodying this invention which was quenched from a temperature of 575 degrees Fahrenheit, or 150 degrees higher than the temperature used for the test of the conventional enamel. This test also illustrates the improvement in the thermal shock resistance of the coating embodying this invention.

It is to be noted that the sudden temperature changes to which these test specimens were subjected are much greater than those which are normally encountered by vitreous coatings under service conditions. Under no conditions would cold water be run into a vitreous coated enamel vessel which is at a temperature of almost 600 degrees Fahrenheit. These tests were designed to stress the enamels to a point of failure, and to clearly illustrate the vastly improved termal shock resistance of the vitreous coatings embodying this invention. The samples of conventional enamel were chosen from the best grades of vitreous enamel available to the industry at the present time, and the greatly superior performance of the new and improved vitreous coating embodying this invention is clearly shown in the figures.

Figure 3:
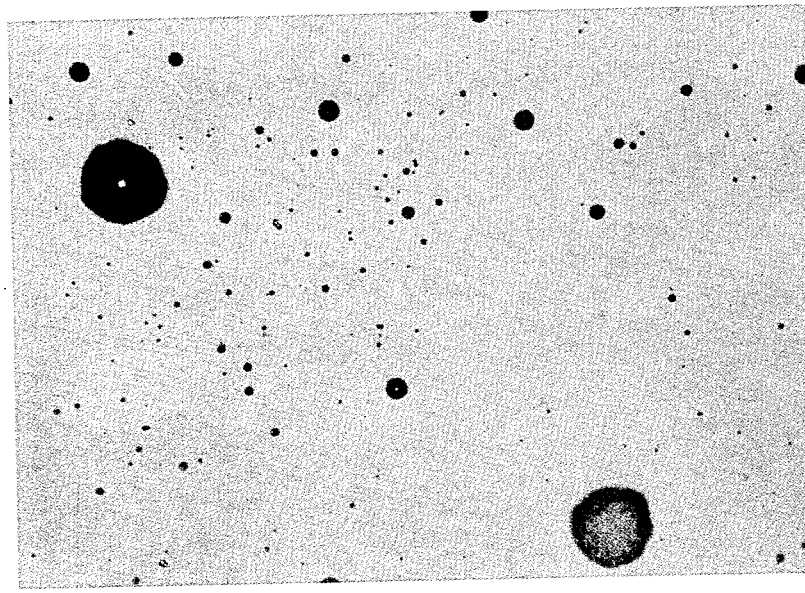
FIG. 3 is a sectional photomicrograph of vitreous enamel coating material of the known type heretofore in use.
Figure 4:
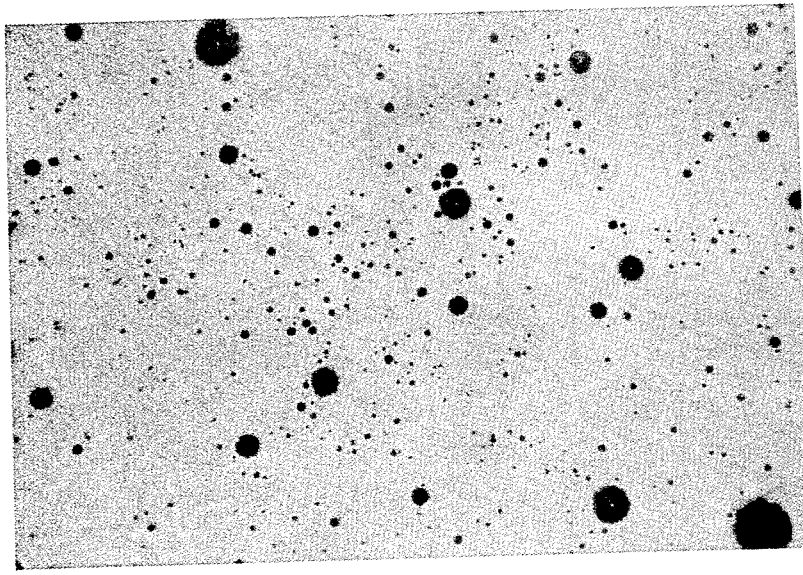
FIG. 4 is a sectional photomicrograph, similar to that of FIG. 3, of vitreous enamel coating embodying this invention.

Referring now to FIGS. 3 and 4, the former shows a sectional photomicrograph of a polished section of a standard and known vitreous enamel whose composition and structure are representative of the enamel heretofore in use. An examination of FIG. 3 shows the presence of two large bubbles along with a large number of medium and small bubbles. Attention is also directed to the fact that the bubbles are irregularly dispersed, leaving areas of almost solid glass, alternating with other areas containing a large number of bubbles. In comparison, the photomicrograph of the section of the novel improved coating embodying this invention, as shown in FIG. 4, shows an even distribution of bubbles of relatively uniform size. There are no large areas of clear glass, nor are there any areas containing dense concentrations of bubbles. This relative homogeneity coupled with the absence of very large bubbles illustrates the refining effect caused by the presence of the discrete particles embedded in the enamel matrix. The discrete particles cannot be seen in the photomicrographs, because they are of a color and an index of refraction which closely corresponds to the enamel.

This invention thus accomplishes its stated objects. By the inclusion of the discrete particles of relatively small size, the bubble structure is refined and the structure of the glass is rendered more homogeneous than was the case in the vitreous enamels heretofore in use. The inclusion of the large discrete particles has the effect of greatly increasing the strength and the thermal shock resistance of the vitreous coating. The incidental advantages enumerated above which are derived from these inclusions include increased abrasion resistance, and the ability to be ground or lapped to receive a high polish. All these improvements have been achieved without the sacrifice of either corrosion resistance or the smoothness of the vitreous surface, so that the improved coatings embodying this invention are applicable to all uses to which vitreous enamels are suited.

While we have shown and described the preferred form of our invention, it will be apparent that various changes and modifications may be made therein, particularly in the form and relation of parts, without departing from the spirit of our invention as set forth in the appended claims.

We claim:

1. An article of manufacture comprising a metallic base having a fused corrosion resistant vitreous coating, said coating comprising a ground coat of adherent fused glass-like composition and a heterogeneous cover coat of corrosion resistant amorphous glass having a multiplicity of substantially evenly distributed voids and a multiplicity of discrete particles distributed evenly throughout said cover coat, said particles being of two sizes, the smaller particles ranging from 500 to 100 mesh, and the larger particles ranging from 20 to 80 mesh, said particles being insufficient in quantity to destroy the gloss of said coating, said coating being characterized by a smooth, glossy surface and high resistance to thermal and mechanical shock.

2. An article of manufacture as claimed in claim 1 wherein said discrete particles comprise between one-half of 1 percent and 12 percent of the weight of said cover coat.

3. An article of manufacture as claimed in claim 1 wherein said discrete particles are composed substantially of silica.

4. An article of manufacture as claimed in claim 1 wherein said discrete particles are composed substantially of silicates.

5. An article of manufacture comprising a metallic base having a fused corrosion resistant vitreous coating, said coating having an adherent matrix of amorphous glass having a multiplicity of minute, substantially evenly distributed bubbles and a multiplicity of evenly distributed discrete particles ranging from 500 to 100 mesh in size, said particles lying entirely within the body of said coating, the quantity of said particles being insufficient to destroy the gloss of said coating, said coating being characterized by a smooth glossy surface and high resistance to thermal and mechanical shock.

6. An article of manufacture as claimed in claim 5 wherein said discrete particles comprise between ½ of 1% and 12% of the weight of said coating.

7. An article of manufacture as claimed in claim 5 wherein said metallic base is composed of metals of the iron and nickel group.

8. An article of manufacture comprising a metallic base having a fused corrosion resistant vitreous coating, said coating having an adherent matrix of amorphous glass having a multiplicity of minute, substantially evenly distributed bubbles and a multiplicity of evenly distributed discrete particles ranging from 20 to 80 mesh in size, said particles lying entirely within the body of said coating, the quantity of said particles being insufficient to destroy the gloss of said coating, said coating being characterized by a smooth glossy surface and high resistance to thermal and mechanical shock.

9. An article of manufacture comprising a metallic base having a fused corrosion resistant vitreous coating, said coating having an adherent matrix of amorphous glass having a multiplicity of minute, substantially evenly distributed bubbles and a multiplicity of evenly distributed discrete particles, said discrete particles falling into two distinct size ranges, the smaller of said particles ranging from 500 to 100 mesh and the larger particles ranging from 20 to 80 mesh, said particles lying entirely within the body of said coating, the quantity of said particles being insufficient to destroy the gloss of said coating, said coating being characterized by a smooth glossy surface and high resistance to thermal and mechanical shock.

10. An article of manufacture comprising a metallic base having a fused corrosion resistant coating, said coating comprising a fused ground coat of adherent fused glass-like composition and a heterogeneous cover coat of corrosion resistant amorphous glass having a multiplicity of substantially evenly distributed discrete particles distributed evenly throughout the cover coat, said particles ranging from 500 to 100 mesh in size, said cover coat being characterized by high resistance to thermal and mechanical shock, the surface thereof being smooth, glossy and free of said particles.

11. The method of appling a glossy corrosion resistant fused vitreous coating to the surface of a metallic body comprising the steps of applying to said surface a fused enamel ground coat, forming a cover coat frit and adding thereto a quantity of discrete particles of inert refractory material having a melting point higher than the fusing temperature of said frit, said particles being of two sizes, the smaller of said particles being between 500 and 100 mesh, and the larger of said particles being between 20 to 80 mesh, the quantity of said particles being insufficient to destroy the glossy surface of said coating, applying the mixture of said frit and refractory particles over said ground coat, and heating and fusing said frit to form a fused cover coat having high resistance to thermal and mechanical shock.

12. The method as specified in claim 11 wherein said inert refractory material is added in the proportion of one-half of 1 percent to 12 percent of the weight of said frit.

13. The method as specified in claim 11 wherein the fusing step is carried out at a temperature between 1400 degrees Fahrenheit and 1700 degrees Fahrenheit.

References Cited in the file of this patent

UNITED STATES PATENTS

| | | |
|---|---|---|
| 806,153 | Kohler | Dec. 5, 1905 |
| 2,311,039 | Emery | Feb. 16, 1943 |
| 2,564,497 | Navias | Aug. 14, 1951 |
| 2,781,636 | Brandes et al. | Feb. 19, 1957 |
| 2,851,376 | Adlassnig | Sept. 9, 1958 |